(12) United States Patent
Goldman et al.

(10) Patent No.: US 11,944,176 B2
(45) Date of Patent: Apr. 2, 2024

(54) MODULATION TECHNIQUES FOR PROLONGING BATTERY LIFE IN A BATTERY-POWERED HAIR DRYER

(71) Applicant: Spur Concepts Inc, San Diego, CA (US)

(72) Inventors: Ryan Goldman, San Diego, CA (US); Jonathan Friedman, San Diego, CA (US); Zachary Rattner, San Diego, CA (US)

(73) Assignee: SPUR CONCEPTS INC., San Diego, CA (US)

( * ) Notice: Subject to any disclaimer, the term of this patent is extended or adjusted under 35 U.S.C. 154(b) by 117 days.

(21) Appl. No.: 17/083,219

(22) Filed: Oct. 28, 2020

(65) Prior Publication Data

US 2022/0022621 A1    Jan. 27, 2022

Related U.S. Application Data

(63) Continuation-in-part of application No. 15/663,735, filed on Jul. 29, 2017, now Pat. No. 10,021,952, and a continuation-in-part of application No. 15/660,601, filed on Jul. 26, 2017, now Pat. No. 10,405,630.

(60) Provisional application No. 62/368,962, filed on Jul. 29, 2016.

(51) Int. Cl.
*A45D 20/12*    (2006.01)
*H02J 7/00*    (2006.01)

(52) U.S. Cl.
CPC ............ *A45D 20/12* (2013.01); *H02J 7/0049* (2020.01); *H02J 7/0063* (2013.01)

(58) Field of Classification Search
CPC ........ A45D 20/12; A45D 20/08; A45D 20/10; A45D 2200/205; H02J 7/0049; H02J 7/0063; H02J 7/0048; H02J 7/007192; H02J 7/005; H02J 7/007; H02J 2007/0067; H02J 7/047
USPC ......... 34/97, 96, 283; 429/61; 320/135, 136, 320/132, 149
See application file for complete search history.

(56) References Cited

U.S. PATENT DOCUMENTS

| | | | | |
|---|---|---|---|---|
| 2002/0108264 A1* | 8/2002 | Perez | ...................... | A45D 20/12 34/96 |
| 2004/0159002 A1* | 8/2004 | Carlucci | ................ | A45D 20/12 34/96 |
| 2015/0053217 A1* | 2/2015 | Steingraber | ............. | A24F 40/50 131/329 |
| 2016/0112957 A1* | 4/2016 | Boothroyd | ............ | H02J 7/0047 455/574 |

* cited by examiner

*Primary Examiner* — John P McCormack
(74) *Attorney, Agent, or Firm* — Michael R. Shevlin

(57) ABSTRACT

Modulation techniques designed to prolong battery life in a battery-powered hair dryer that utilizes infrared technology as part of the heating element. Modulation techniques can be used to extend battery run time without significant degradation and optimize end-of-life performance.

12 Claims, 16 Drawing Sheets

MODULATION TECHNIQUES FOR PROLONGING BATTERY LIFE IN A BATTERY-POWERED HAIR DRYER

CROSS-REFERENCE TO RELATED APPLICATIONS

This application is a continuation-in-part of U.S. patent application Ser. No. 15/663,735, filed Jul. 29, 2017, and a continuation-in-part of U.S. patent application Ser. No. 15/660,601, filed Jul. 26, 2017, both of which claim the benefit of U.S. Provisional Application No. 62/368,962, filed on Jul. 29, 2016; and related to U.S. patent application Ser. No. 15/937,757, filed on Mar. 27, 2018, titled SYSTEMS AND METHODS FOR COOLING BATTERIES IN A BATTERY POWERED BLOW DRYER, all of which are incorporated herein by reference.

FIELD

This invention relates to the general field of hair dryers, also known as blow dryers, and specifically toward modulation techniques for prolonging battery life in a battery-powered hair dryer.

BACKGROUND

Typical hair dryers use a simple resistive wire (usually nichrome) for the heating element, similar to what is found in a toaster. When power is supplied to the hair dryer, the heating coil responds by quickly heating the air within the apparatus. As the dryer operates at various levels of power (e.g., high, medium, or low), varying amounts of current run through the resistive wire and the desired levels of heat output are achieved. The heated air is then forcefully expelled out of the device by means of a rotating fan. This results in accelerating the process of removing moisture absorbed within the hair follicle by rapidly heating the temperature of the hair.

The hair dryer typically receives power transmitted through a cord that is plugged into a wall outlet, limiting where the dryer can be used. Some manufactures have set out to build battery-powered hair dryers to eliminate the cord but all of them use the same heating element as the corded hair dryer, resistive wires. The thermal inertia of resistive wire is very low, meaning the heat output reacts almost instantaneously to changes in the source power. To prolong run time and battery life, the battery-powered hair dryers bring the power draw down to a level that the battery can support, increasing run time by lowering the output heat and sacrificing performance. Heat output is directly proportional to input power. Reducing the power level needed to run the hair dryer has undesirable side effects—namely reduced output heat.

It would be desirable to provide modulation techniques that prolong battery life of a battery-powered hair dryer.

SUMMARY

Battery life is a critical performance metric, and this invention extends the run time of the product while still maintaining heat and airflow. The present invention uses pulse width modulation (PWM) to adjust the power of a battery powered hair dryer having to two or more infrared bulbs. Using PWM extends the run time and battery life. Various modulation techniques may be used to lower the power, cycle the power, pulse the power, adjust the power using different modes for the right and left infrared bulbs.

The present invention exploits the physical properties of infrared bulbs to precisely control the heating output to balance the tradeoff between extending run time and maximizing performance. By leveraging the infrared bulbs higher thermal inertia, the invention is able to reduce power to extend the run time without having comparable reductions in heat.

BRIEF DESCRIPTION OF THE DRAWINGS

The present embodiments may be understood from the following detailed description when read in conjunction with the accompanying figures. It is emphasized that the various features of the figures are not necessarily to scale. On the contrary, the dimensions of the various features may be arbitrarily expanded or reduced for clarity.

DETAILED DESCRIPTION

Embodiments of the invention will now be described with reference to the figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

The present invention discloses modulation techniques that are designed to prolong battery life in a battery-powered hair dryer the utilizes infrared technology as part of the heating element. Modulation techniques can be used to extend battery run time without significant degradation and optimize end-of-life performance. One example of a heating element using infrared technology is disclosed in U.S. patent application Ser. No. 15/660,601, filed Jul. 26, 2017, titled SYSTEMS AND METHODS FOR DELIVERING HEAT IN A BATTERY OPERATED BLOW DRYER, herein incorporated by reference.

The infrared bulbs have a higher thermal inertia than traditional heating elements and the present invention is configured to exploit the physical properties of infrared bulbs by using modulation techniques to precisely control the heating output to balance the tradeoff between extending run time and maximizing performance. By doing this, the invention is able to reduce power without having comparable reductions in heat and airflow.

Figure 1:
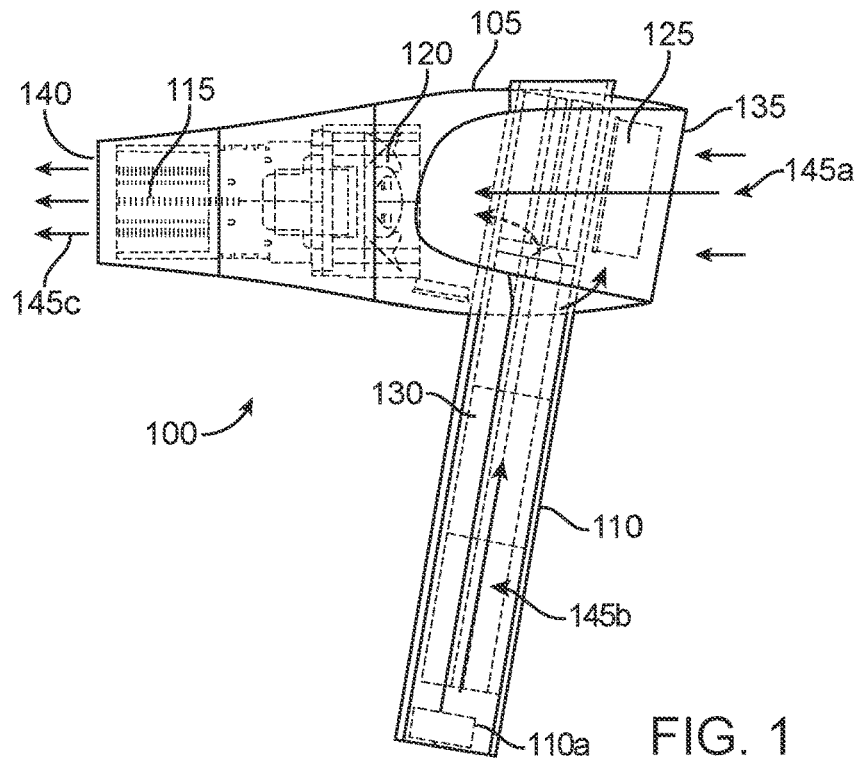
FIG. 1 shows one embodiment of a battery-powered hair dryer.

FIG. 1 shows a battery-powered hair dryer 100 having a case 105 with a handle 110, a heating element 115, a fan 120, a control circuitry 125 and one or more batteries 130 to power the components. The case includes case air flow channel with an air inlet 135 and air outlet 140. The fan draws in air 145a through the inlet 135, the air 145 flows through the case and is blown over/through the heating element to heat, and the heated air 145c exits through the outlet 140.

Figure 2:
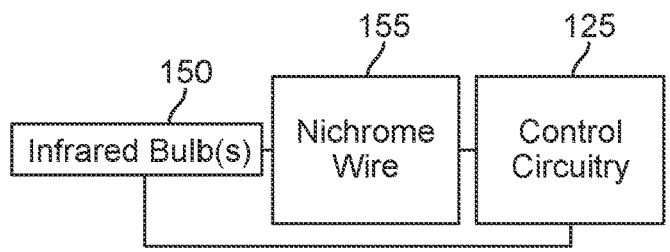
FIG. 2 shows a schematic of the heating element system coupled to the control circuitry.

FIG. 2 shows a schematic of the heating element system 115 coupled to the control circuitry 125. The heating element 115 includes one or more infrared bulbs 150 and one or more nichrome wire component 155 that are combined to provide heat when the hair dryer is turned on.

Figure 3:
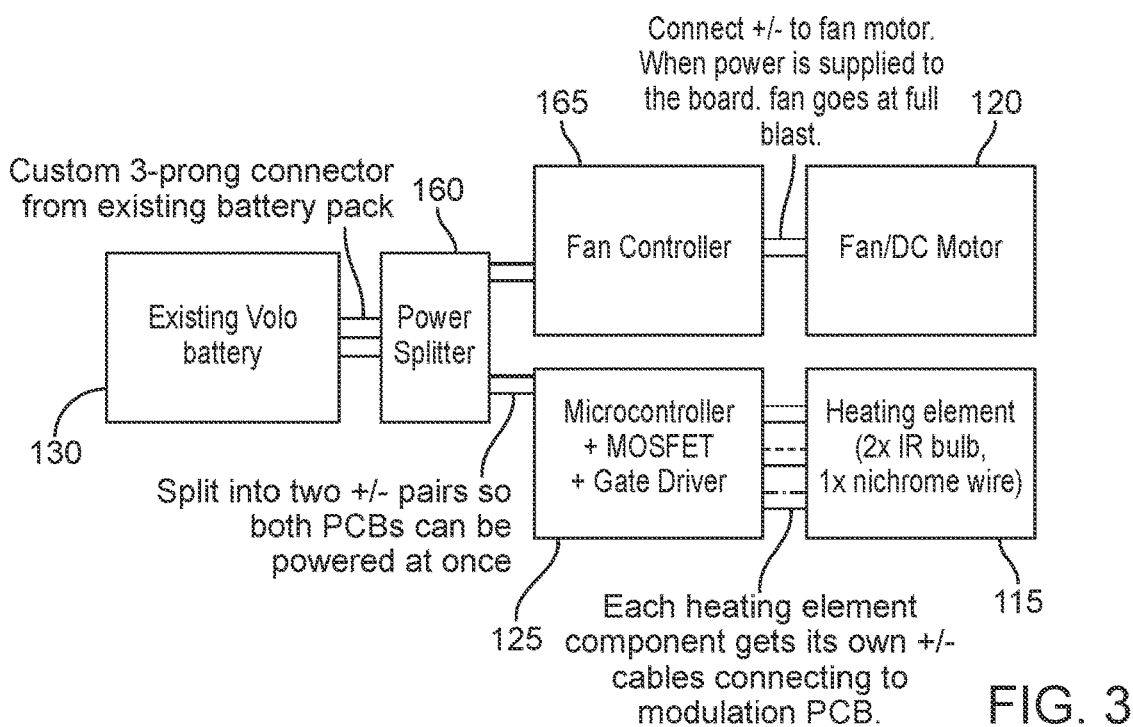
FIG. 3 shows a schematic of the components in the battery-powered hair dryer.

FIG. 3 shows a schematic of the components in the battery-powered hair dryer 100 having the one or more batteries 130 sending power to a power splitter 160 that is configured to split and send the power to the different components. In the embodiment shown, the power splitter 160 sends a first part of the power to a fan controller 165 configured to control the fan 120, and second part of the power to the control circuitry 125. The control circuitry 125 includes a microcontroller; and Gate Driver and MOSFET that is configured to power each of the heating elements 115.

Power Modes—Altering Battery Behavior Before Depletion

The power modes are used to alter the behavior of the battery to prolong batter life before it is depleted. The power modes are controlled by algorithms that will ramp down power to the heating elements to extend the remaining battery life as the dryer gets closer to end of life.

In some embodiments, the control circuitry is configured to control power management by monitoring the battery behavior and determining the battery state-of-charge in real-time during charging or discharging (similar to a gas gauge). The battery information is input into the algorithm configured to control the power to the heating elements to alter the battery behavior to maximize the run time. When a power mode is selected, the algorithm is configured to calculate the remaining battery life before depletion and provide ramp down parameters for delivering power to the heating elements to extend the remaining battery life.

In some embodiments, the power to the heating elements is reduced in a tiered or stepped manner. In some embodiments, the power to the heating elements is reduced in a gradually decreased.

Power Mode 1—This power mode includes multiple steps of power reduction to the heating element to extend the run time. Power Mode 1 initially provides 100% or full power to the heating elements until the algorithm calculates that there is 4 minutes (of full-power) battery life remaining. The power is then stepped down to 50% power until the algorithm calculates that there is about 45 seconds (of full-power) battery life remaining. The power to the heating elements is stopped and the dryer switches to cool shot to blow air until the battery is depleted.

Power Mode 2—This power mode is a Full Power Mode that does not step down the power to the heating elements. Power Mode 2 provides 100% or full power to the heating elements until the algorithm calculates that there is 45 seconds of battery. The power to the heating elements is stopped and the dryer switches to cool shot to blow air until the battery is depleted.

Modulation Technique to Control Battery Power

The control circuitry 125 is configured to provide the modulation technique of the invention with the microcontroller to precisely control the output of the infrared bulbs 150 and/or nichrome wire components 155 and by making updates thousands of times per second in response to parameters such as discharge time, measured temperature, and remaining charge. This includes a feedback loop configured to allow course correction if the heat output drops below certain limits, allowing the dryer to extend battery life but still have control over the output heat.

For example, the modulation technique can benefit from ambient temperature—a warmer room requires less power to heat the hair to a predefined temperature, so less power would be needed than if the dryer were running in a colder room. Current solutions on the market are unable to benefit from fluctuations in ambient temperature.

In one embodiment, the modulation technique may use a technique known as pulse width modulation (PWM) to control the heat output of the infrared bulbs 150 and/or nichrome wire components 155. With PWM, instead of driving the infrared bulbs 150 and/or nichrome wire components 155 with a constant voltage source over time, the voltage source is on for a particular percentage of the time. This causes the infrared bulbs 150 to flicker on and off at a rate indistinguishable to the naked eye, with the duration of each state dependent on a measure known as the duty cycle. A PWM signal with a duty cycle of 100% is on all of the time, where 75% would be on only 75% of the time.

Current is only drawn from the battery in the "on" state of PWM, resulting in power savings when the unit is in the "off" state. Since the infrared bulbs 150 have inertia, it takes some time to cool down. This property can be exploited here to drive the infrared bulbs with a PWM signal instead of constant voltage for power savings. The inertial heat property of the infrared bulbs 150 will smooth out the peaks and troughs of the PWM signal so that the temperature is essentially constant from the end user's perspective. The power savings increases the run time of the battery powered hair dryer without a large loss of heat.

Various modulation technique may be used for the infrared bulbs 150, including:
  reducing the power a constant amount for both infrared bulbs, for example 80% power to the left and right infrared bulbs;
  reducing the power at various times multiple amounts for both infrared bulbs, such as 100% power for 4 m, 80% from 4 m, to 8 m, 40% power from 8 m on until the battery is depleted;
  pulsing the power to the infrared bulbs out of phase at different times, for example 100%-80%-40% where the left infrared bulb at 100% and right infrared bulb at 70% for 2 seconds, then switch to the left infrared bulb at 70% and right infrared bulb at 100% for 2 seconds, the repeat.

Various modulation technique may be used for the nichrome wire components 155, including:

reducing the power a constant amount;

reducing the power at various times, such as 100% power for 4 m, 80% from 4 m, to 8 m, 40% power from 8 m to the end;

pulsing the power at various time intervals, where the nichrome wire component is at 100%, then to 70% and then 100%, repeating.

Programmable

The hair dryer described herein may be programmable to change or update the modes/algorithms. The hair dryer may be programmed using known means. In some embodiments, the programming can be through a smart charging base having Wi-Fi, Bluetooth or cellular connectivity. When the hair dryer is placed in the base, the charging connector may be able to communicate with the control circuitry to change or update modes/algorithms program the hair dryer when it is placed in the base. In some embodiments, the programming to the power control circuitry can be through a special adaptor or plug that goes into the dryer head when the battery is not in place. In some embodiments, the hair dryer may have a USB plug that can be connected to a computer, tablet or phone to program or update the modes/algorithms in the power control circuitry. A USB flash device having the program or update the modes/algorithms may also be used. In some embodiments the hair dryer may include a flash memory card slot or storage card slot so the programming may be delivered on a flash memory card or storage card.

Testing

Testing was done using a battery powered hair dryer by measuring the heated air temperature as it exits and the run time of the battery. Various configurations were tested using PWM to control the heat output of the infrared bulbs to increase the run time. The battery power hair dryer configuration used in the tests included a microcontroller coupled with a hybrid heating element 115 having two infrared bulbs labeled left and right infrared bulbs (200 W each) and one nichrome wire (200 W). The microcontroller used various modulation techniques to control the power to the left and right infrared bulbs at different power levels to determine a modulation setting that would provide the longest rung time before the temperature dropped below the baseline temperature.

Two commercially available plug-in hair dryers were also tested, the Conair 1875 and the Solano Turbo Ultralite (1700 W), and the temperatures we were used as a baseline temperature for the battery powered blow tryer.

The tests were done for the battery powered hair dryer using the following configurations:

100% Constant Power without PMW—this was used as the baseline

100% Constant Power with PMW Board—adds additional circuitry

70% to 100% Power with PWM, each bulb power being out of phase

80% Constant Power with PMW

50% Constant Power with PMW

100%-80%-40% Power with PMW

Tests were also done using the Conair 1875 and the Solano Turbo Ultralite (1700 W) to determine the temperature of a commercially available corded hair dryer to compare to the temperature for the battery powered hair dryer.

Test Results Summary

| Device tested | Run Time (time vs baseline) | Average Temp @ 4 min (deg F.) | % change from Baseline |
|---|---|---|---|
| Conair 1875 | n/a | 180.5 | |
| Solano Turbo Ultralite | n/a | 184.2 | |
| 100% Constant Power Constant power to the left and right infrared bulbs. | 10 m 45 s | 193.28 | Baseline |
| 100% Power with PWM Constant power to the left and right infrared bulbs. | 10 m 40 s (−5 s) | 182.48 | −0.8% |
| 70% to 100% Power power pulsed 70% to 100% out of phase to the left and right infrared bulbs. | 11 m 30 s (+50 s) | 188.24 | +7.8%. |
| 80% Constant Power Constant power to the left and right infrared bulbs. | 11 m 10 s (+30 s) | 183.74 | +4.7% |
| 50% Constant Power Constant power to the left and right infrared bulbs. | 16 m 45 s (6 m 5 s) | 131.0 | +57% |
| 100%-80%-40% Power power lowered from 100% to 80% to 40% to the left and right infrared bulbs. | 12 m 10 s (+1 m 30 s) | 188.6 | +13.2% |

The test results show that the run time of the battery powered hair dryer can be altered by modulating the power to the infrared bulbs. Most of the battery operated hair dryer temperatures were the about the same or higher than the baseline corded hair dryers. The only one power setting that went significantly below the baseline temperature was the 50% reduction in power.

The best performing modulation technique was the 100%-80%-40% which extend runtime by 85 seconds, from 10 m 45 s to 12 m 10 s, an increase of 13.2%, with the average temperature after 4 minutes of runtime reduced 2.4%, from 193.28 deg. F to 188.6 deg. F. The next best modulation technique was the 70% to 100% which extend runtime by 45 seconds from 10 m 45 s to 11 m 30 s, an increase of 7%, with the average temperature after 4 minutes of runtime reduced 22.6% from 193.28 deg. F to 188.24 deg. F.

Test Results

Conair 1875

Figure 4A:
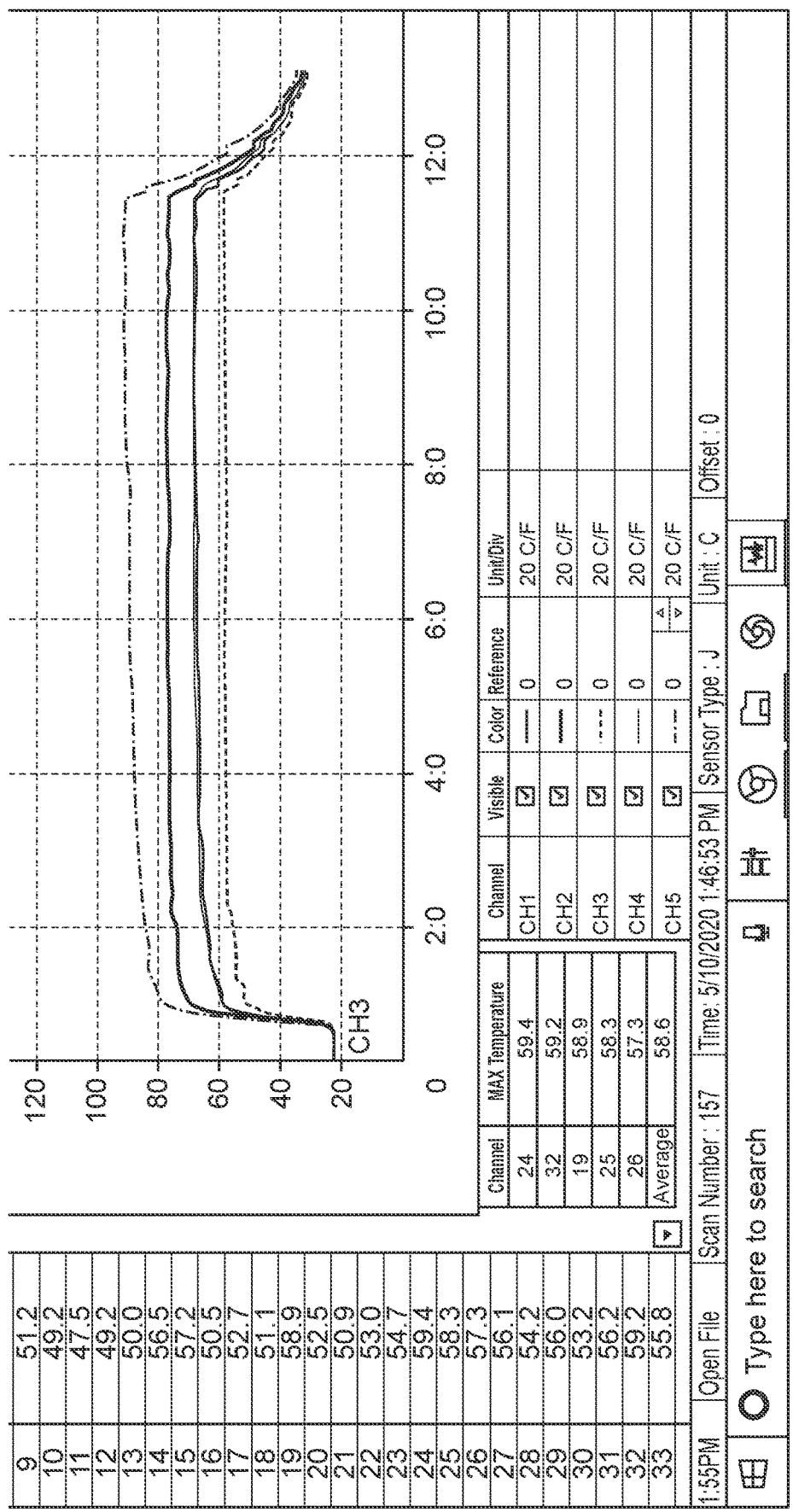
FIGS. 4A and 4B show the temperature test results for the Conair 1875.
Figure 4B:
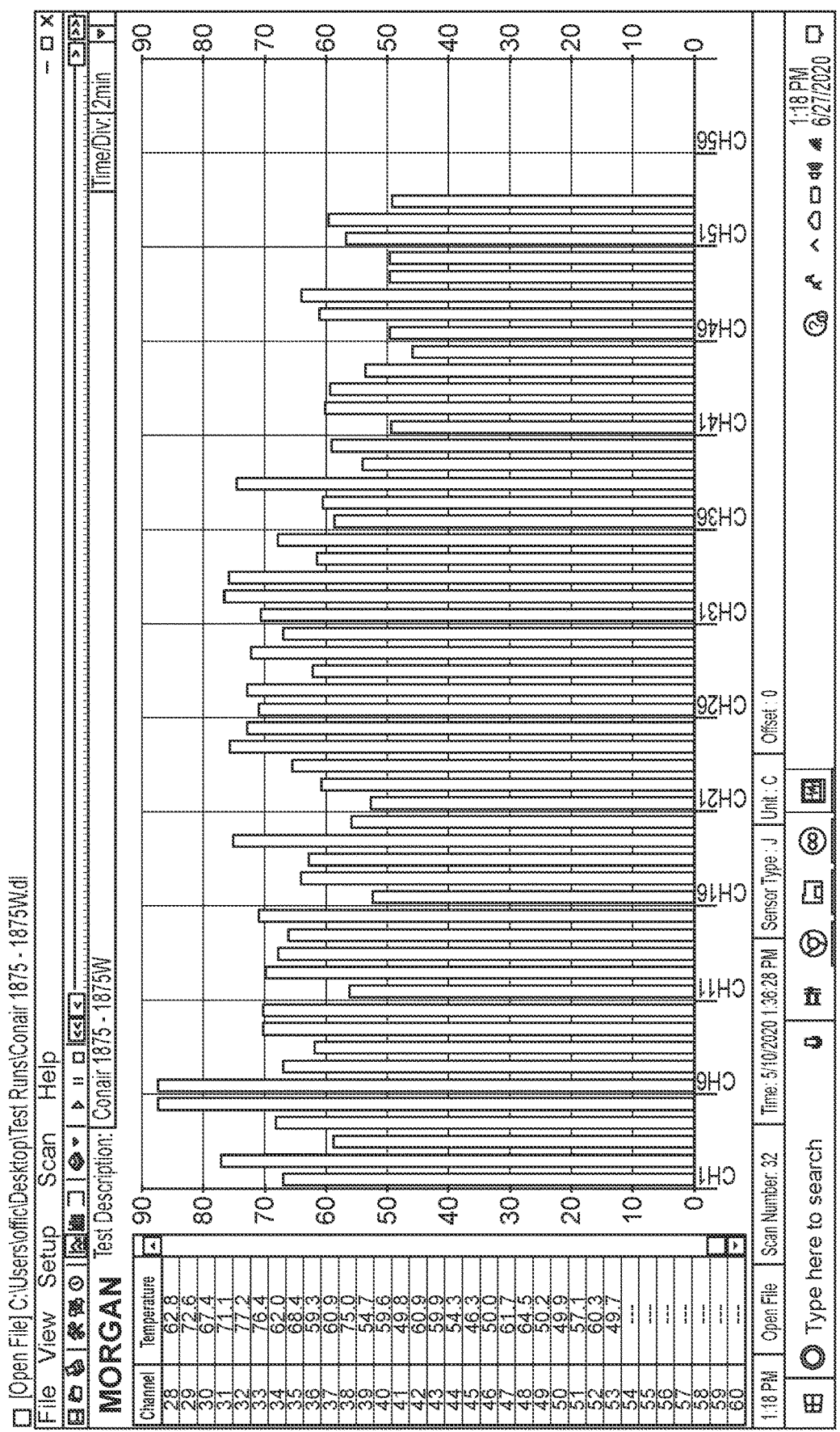

FIGS. 4A and 4B show the temperature test results for the Conair 1875. FIG. 4A is a graph showing Temp. vs Time and FIG. 4B is a bar chart with each bar representing a single temperature reading at a particular point in time. During the test run, the average temperature @4 min was 180.5 deg. F.

Solano Turbo Ultralite (1700 W)

Figure 5A:
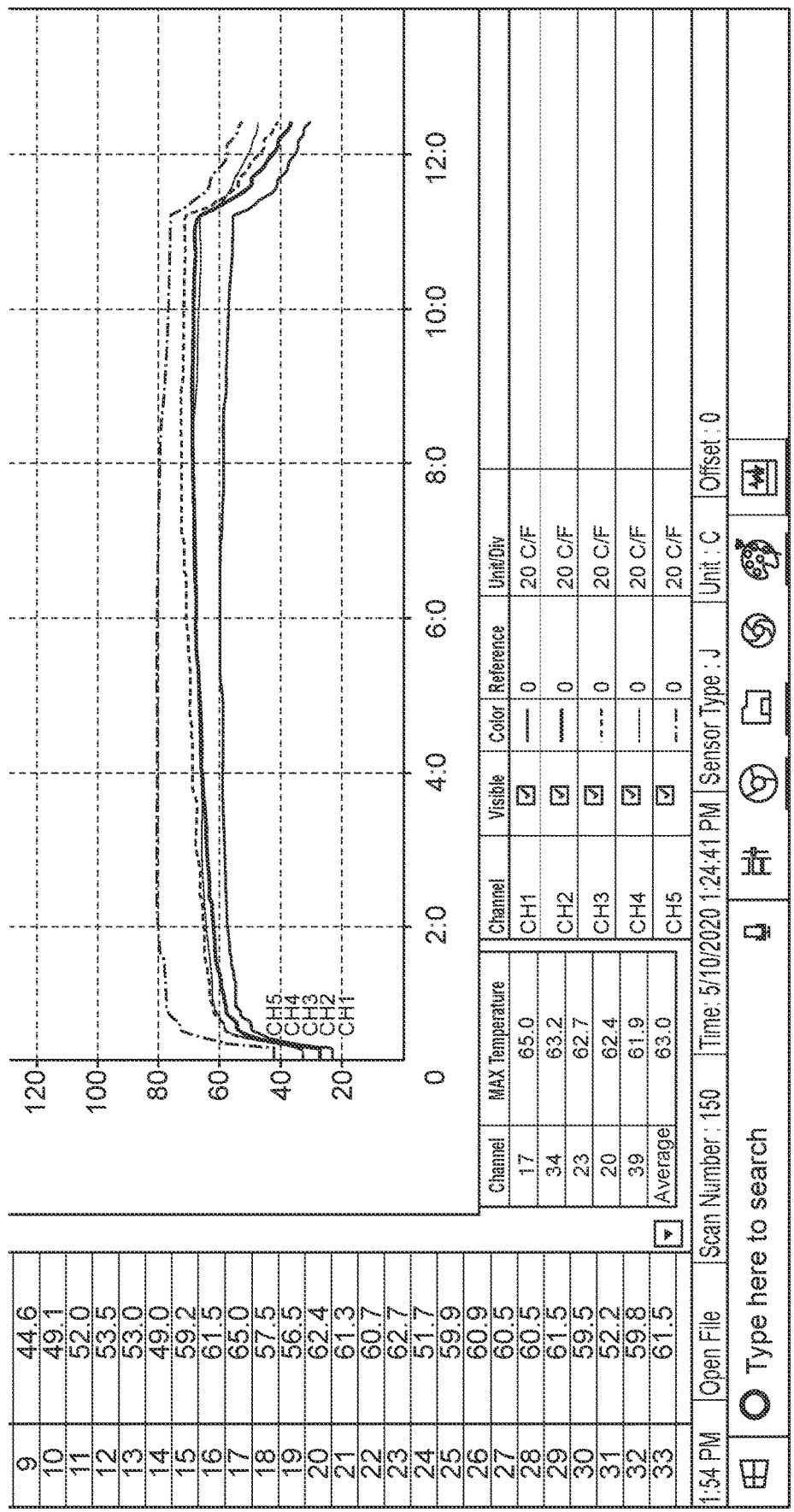
FIGS. 5A and 5B show the temperature test results for the Solano Turbo Ultralite (1700 W).
Figure 5B:
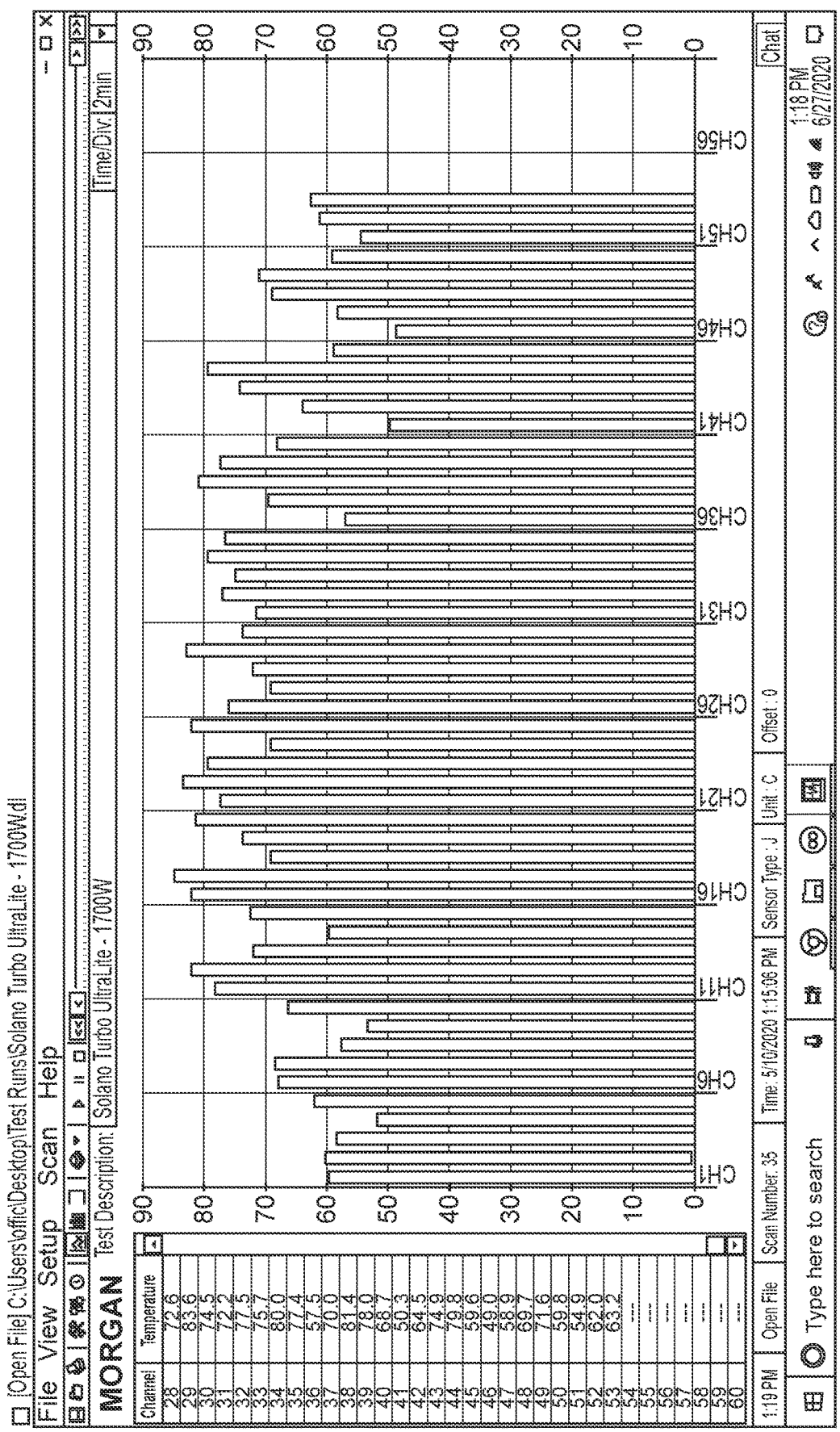

FIGS. 5A and 5B show the temperature test results for the Solano Turbo Ultralite (1700 W). FIG. 5A is a graph showing Temp. vs Time and FIG. 5B is a bar chart with each bar representing a single temperature reading at a particular point in time. During the test run, the average temperature @4 min was 184.5 deg. F.

100% Power (Baseline)

Figure 6A:
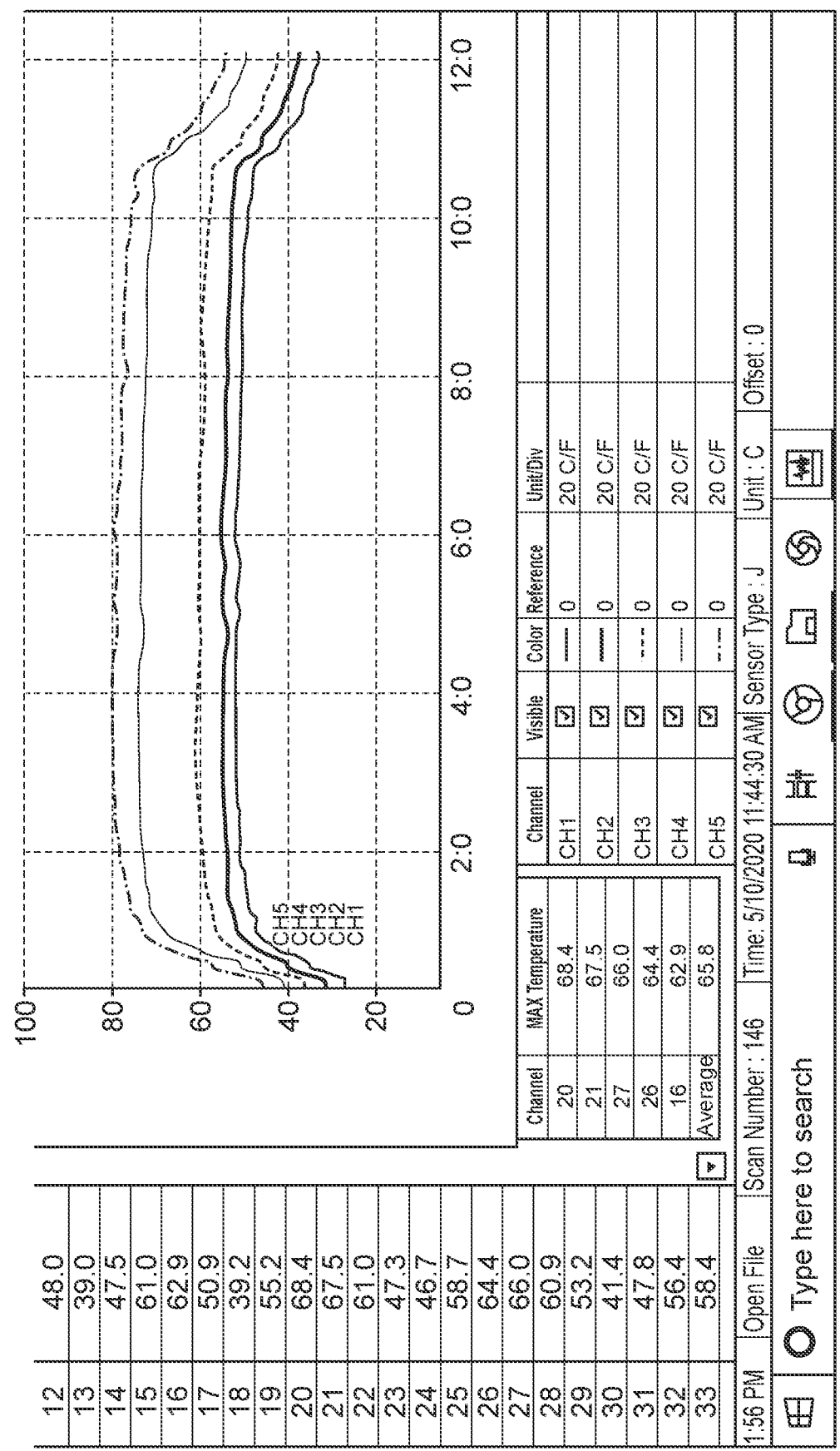
FIGS. 6A and 6B show the temperature test results for the battery operated hair dryer having at 100% constant power to the left and right infrared bulbs.
Figure 6B:
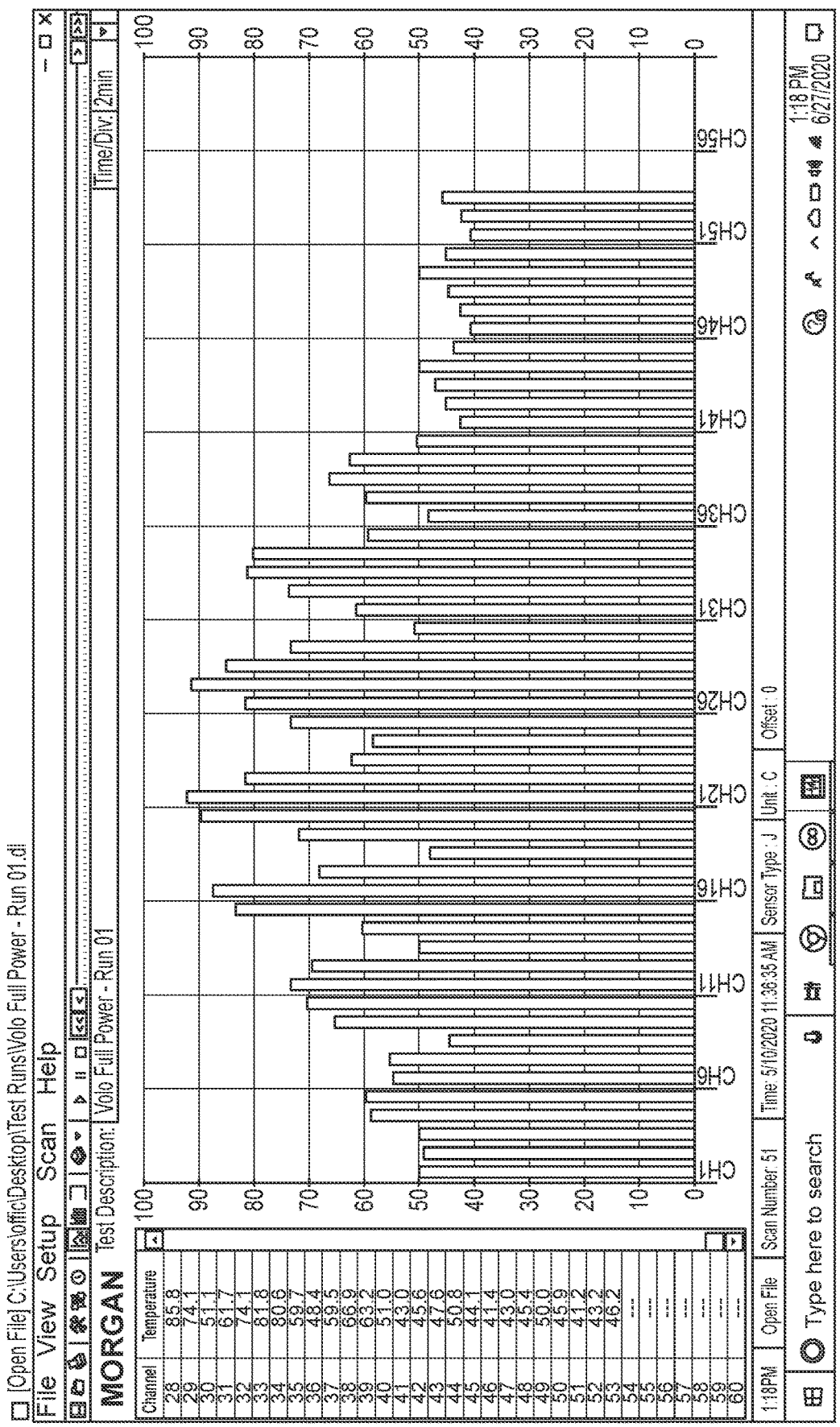

FIGS. 6A and 6B show the temperature test results for the battery operated hair dryer having at 100% constant power to the left and right infrared bulbs. This configuration did not have a PMW. FIG. 6A is a graph showing Temp. vs Time. FIG. 6B is a bar chart with each bar representing a single temperature reading at a particular point in time. During the test run, the average temperature @4 min was 193.28 deg. F and the runtime was 10 minutes 45 seconds.

100% Power with PWM Board

Figure 7A:
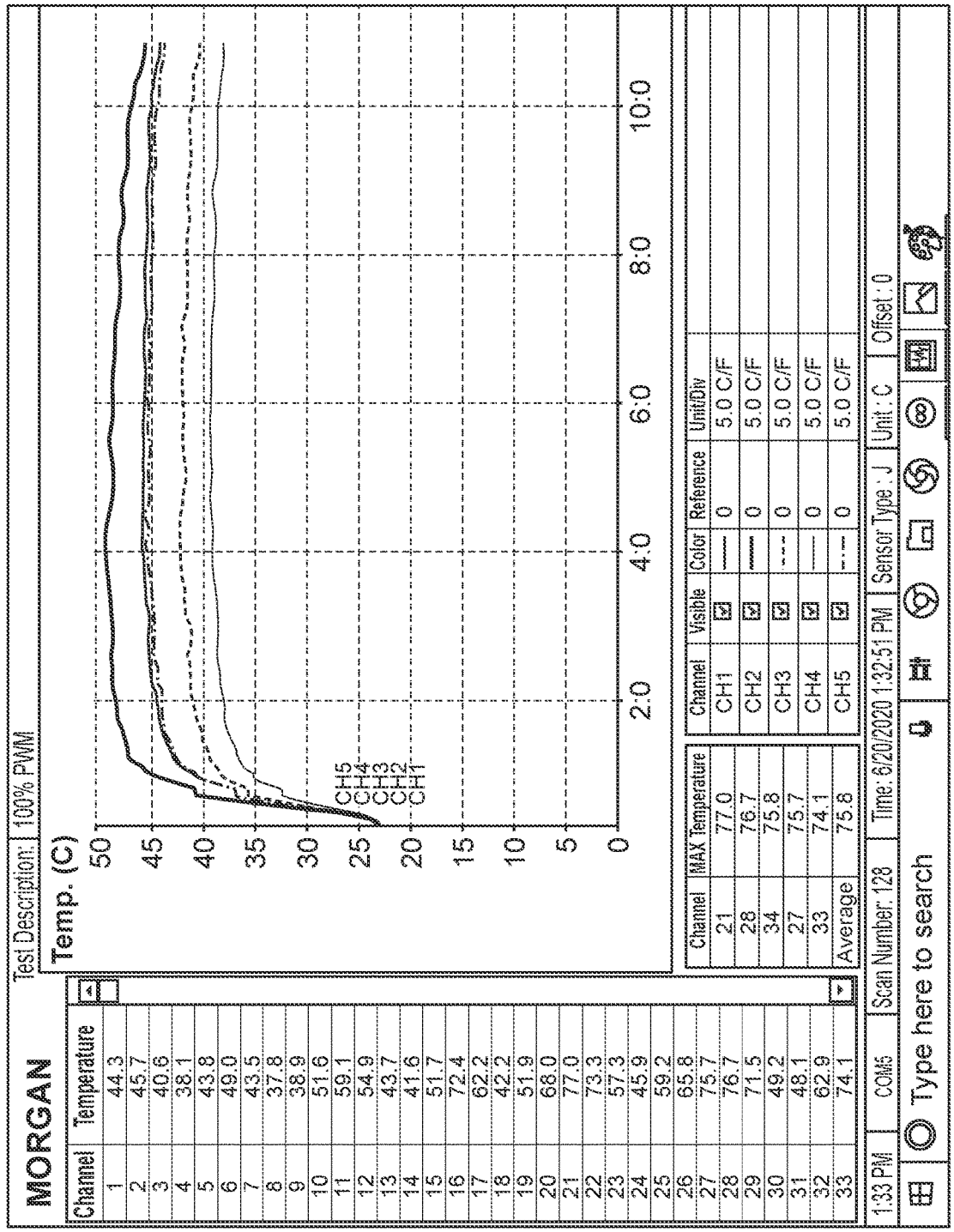
FIGS. 7A and 7B show the temperature test results for the battery operated hair dryer having a PMW at 100% constant power to the left and right infrared bulbs.
Figure 7B:
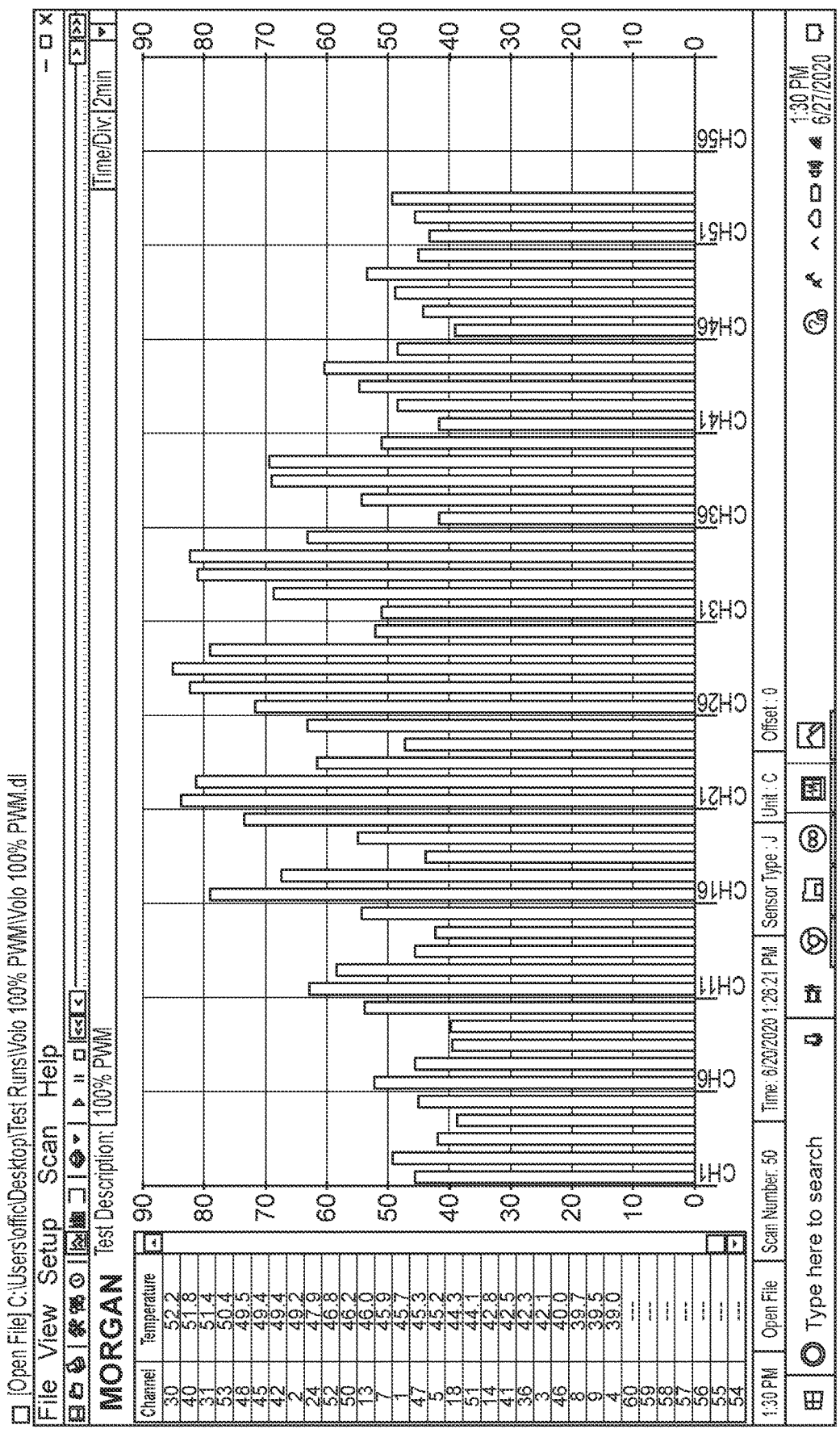

FIGS. 7A and 7B show the temperature test results for the battery operated hair dryer having a PMW at 100% constant power to the left and right infrared bulbs. The PWM board adds additional circuitry to the power PCB. These extra components draw additional power, which can affect runtime. The purpose of this experiment was to establish a baseline for what this overhead was. The battery lasted 5 seconds less (0.8% reduction). FIG. 7A is a graph showing Temp. vs Time. FIG. 7B is a bar chart with each bar representing a single temperature reading at a particular point in time. During the test run, the average temperature @4 min was 182.48 deg. F and the runtime was 10 minutes 40 seconds.

70% to 100% Power with PWM out of Phase

Figure 8:
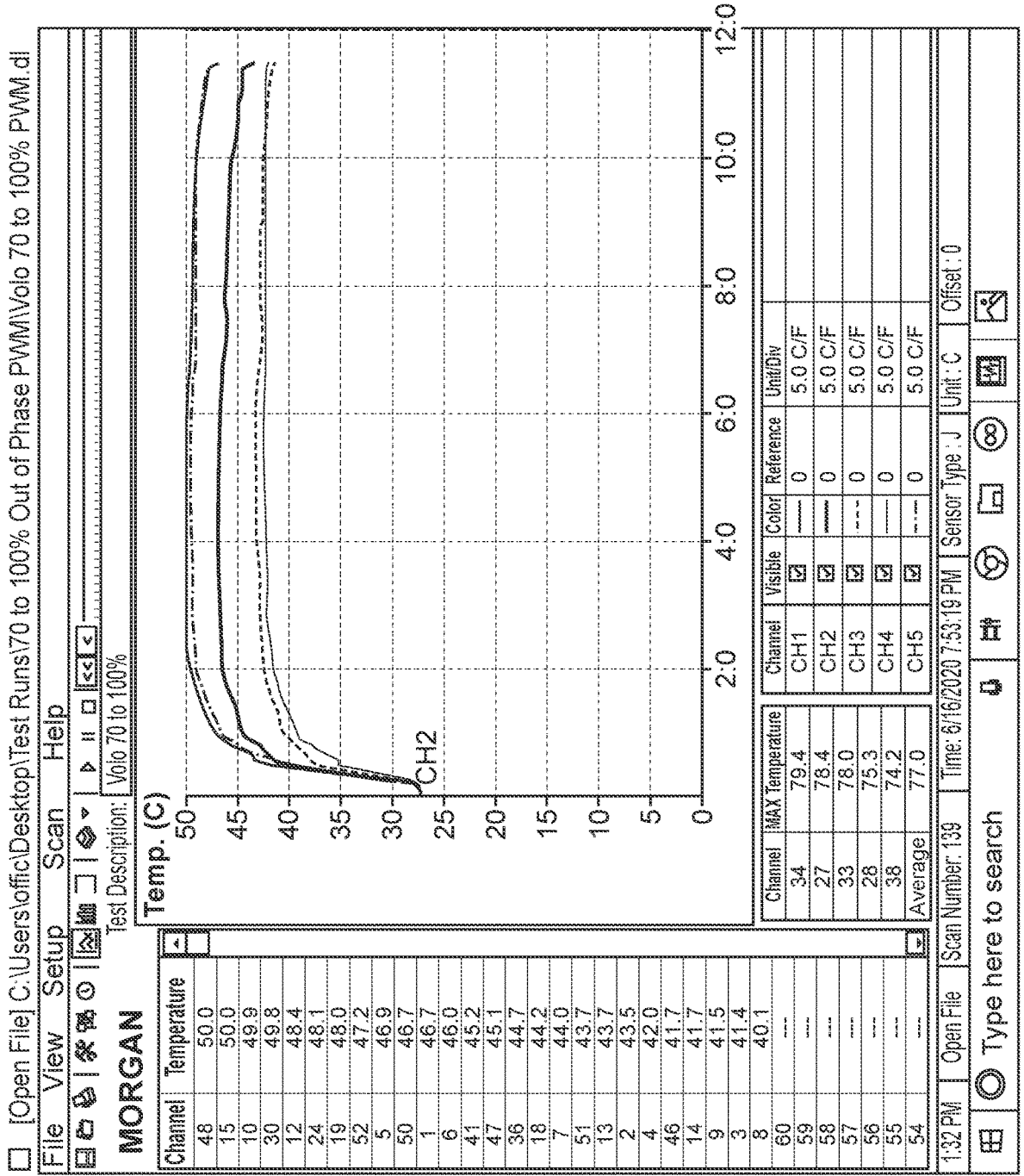
FIG. 8 shows the temperature test results for the battery operated hair dryer with pulsed between 70% and 100% power to the right and left infrared bulbs, taking 2 seconds to complete a full cycle.

FIG. 8 shows the temperature test results for the battery operated hair dryer with pulsed between 70% and 100% power to the right and left infrared bulbs, taking 2 seconds to complete a full cycle. The right infrared bulb is pulsed out of phase with the left infrared bulb, meaning when left infrared bulb was at 70%, right infrared bulb was at 100%. Nichrome was at 100%. During the test run, the average temperature @4 min was 188.24 deg. F and the runtime was 11 minutes 30 seconds. This configuration increased the run time by 50 s or 7.8%.

80% Constant Power

Figure 9A:
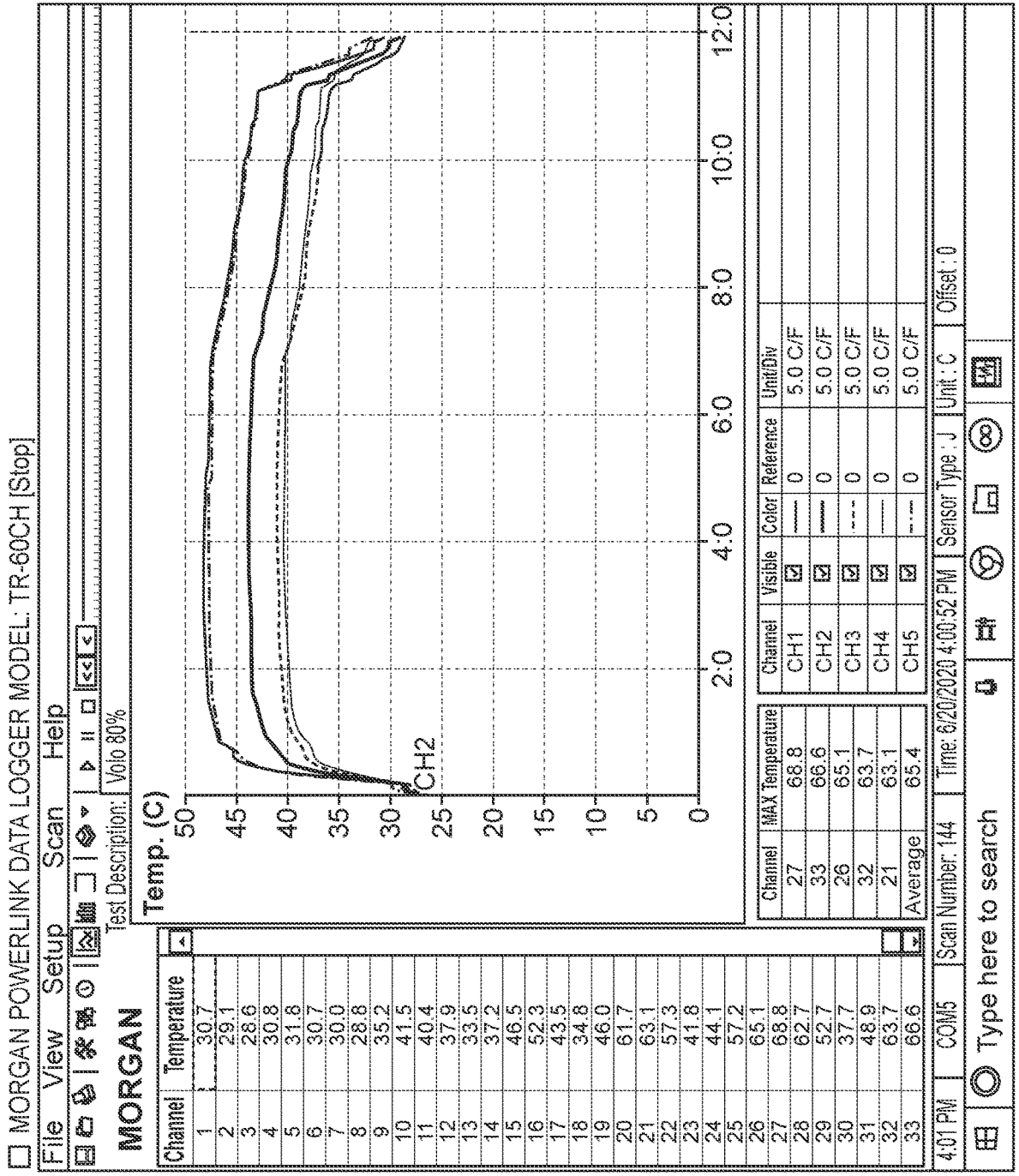
FIGS. 9A and 9B show the temperature test results for the battery operated hair dryer having a PMW at 80% constant power to the left and right infrared bulbs.
Figure 9B:
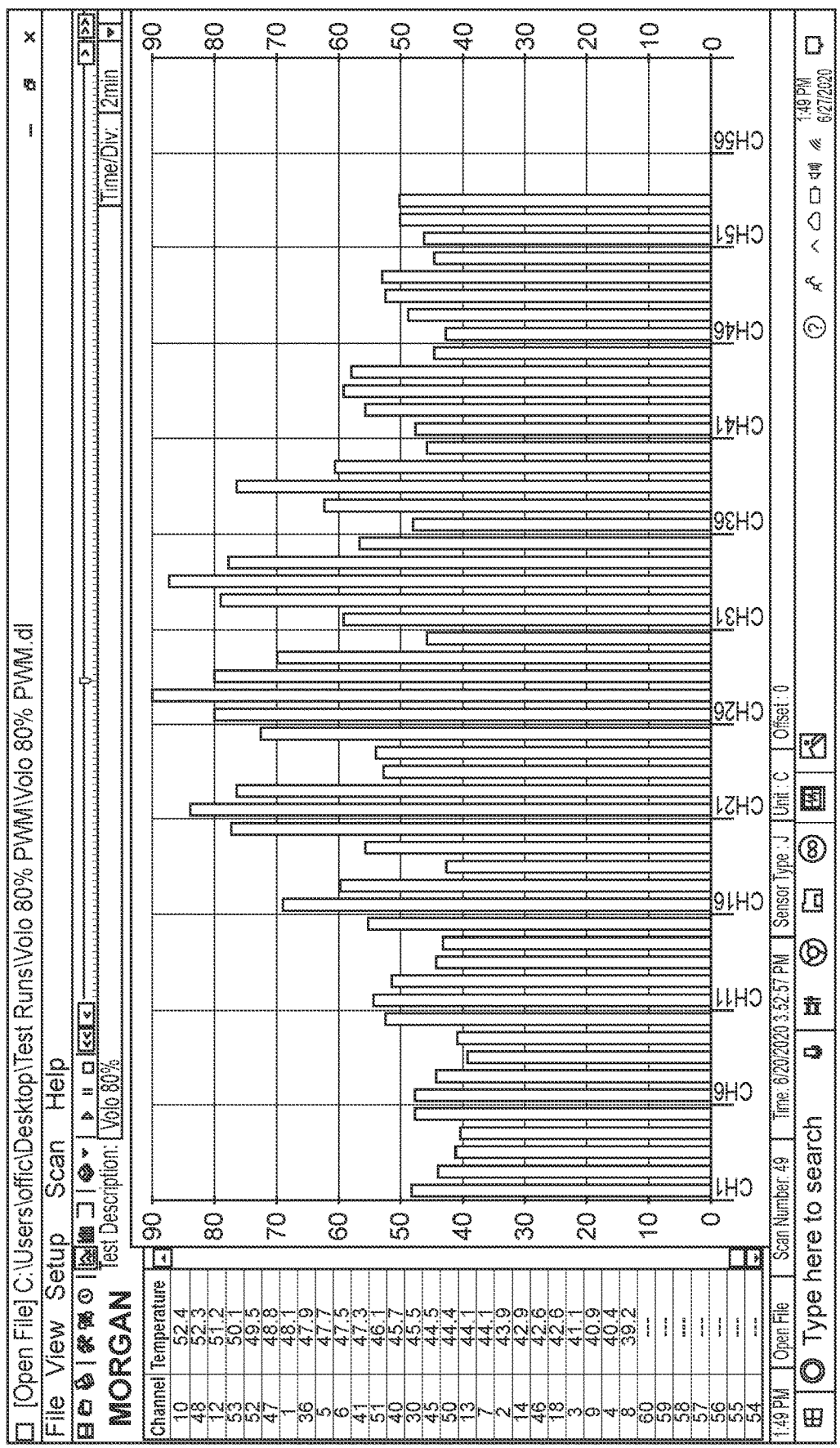

FIGS. 9A and 9B show the temperature test results for the battery operated hair dryer having a PMW at 80% constant power to the left and right infrared bulbs. Nichrome was at 100%. The 80% constant PWM served as a comparison point to measure the efficiency of the PWM circuitry. Since nichrome was not modulated at all and the two IR bulbs were reduced to 80% capacity, the runtime should increase about 15% by doing this. In actuality, the runtime only increased 5%, which shows some efficiency loss when running PWM.

50% Constant Power

Figure 10A:
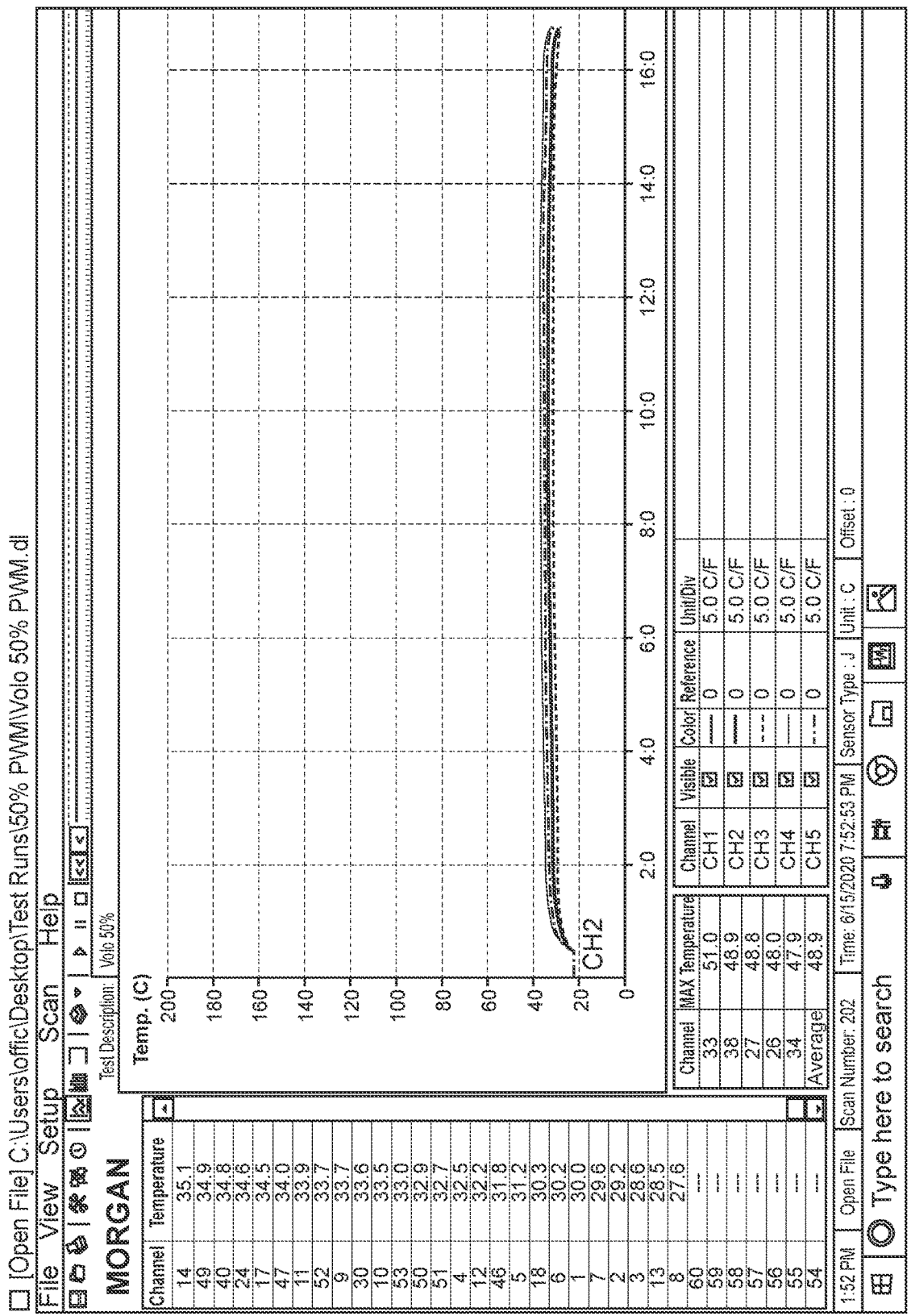
FIGS. 10A and 10B show the temperature test results for the battery operated hair dryer having a PMW at 50% constant power to the left and right infrared bulbs.
Figure 10B:
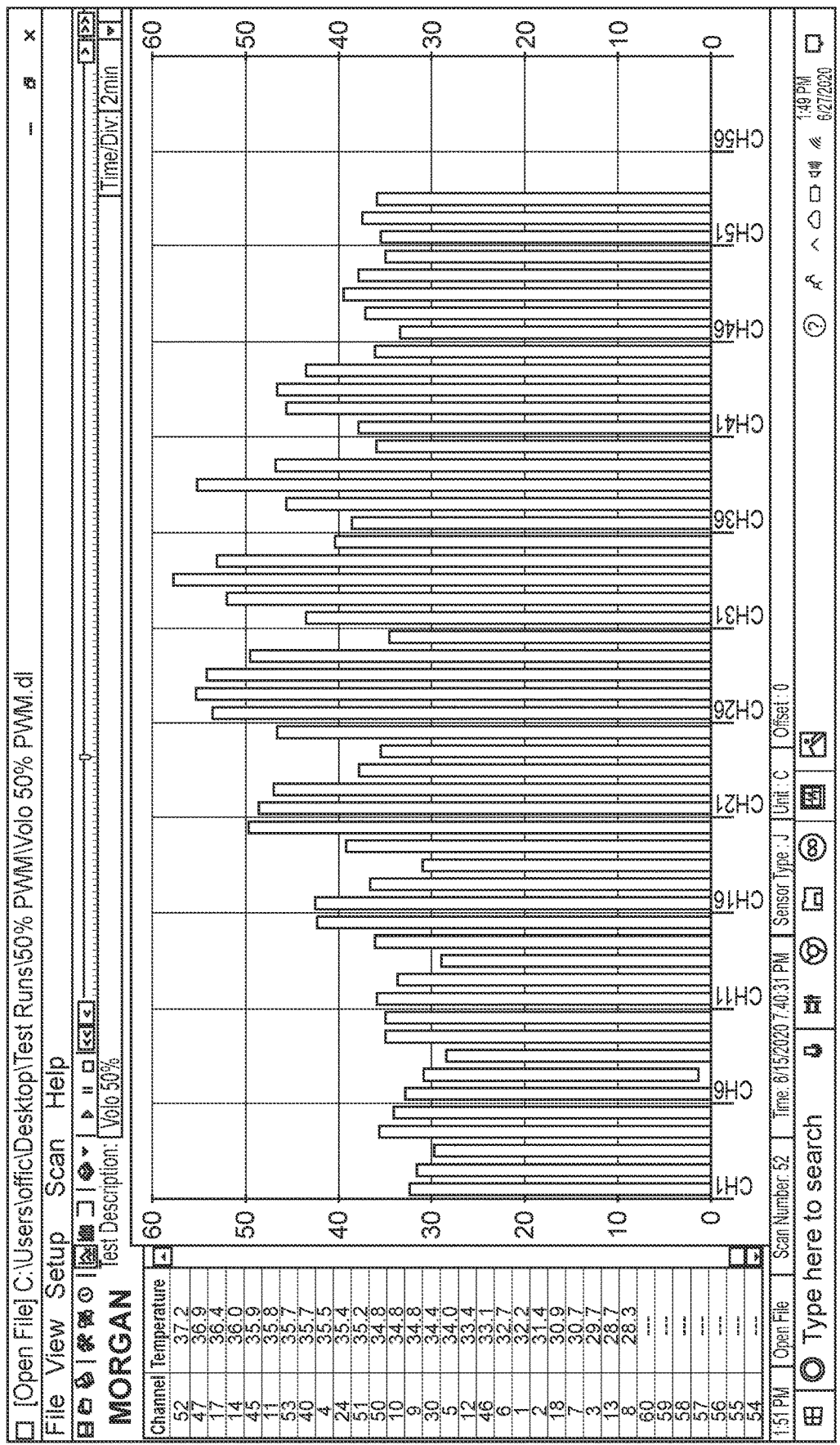

FIGS. 10A and 10B show the temperature test results for the battery operated hair dryer having a PMW at 50% constant power to the left and right infrared bulbs. Nichrome was at 100%. The 50% constant power was used to put an upper bound on how long to expect the modulation to extend battery life. The nichrome was not modulated. During the test run, the average temperature @4 min was 131.0 deg. F and the runtime was 16 minutes 45 seconds. While this configuration increased the run time by 6 m or 7.8%, the average temperature was significantly lower.

100%-80%-40% Power with Time Delay

Figure 11A:
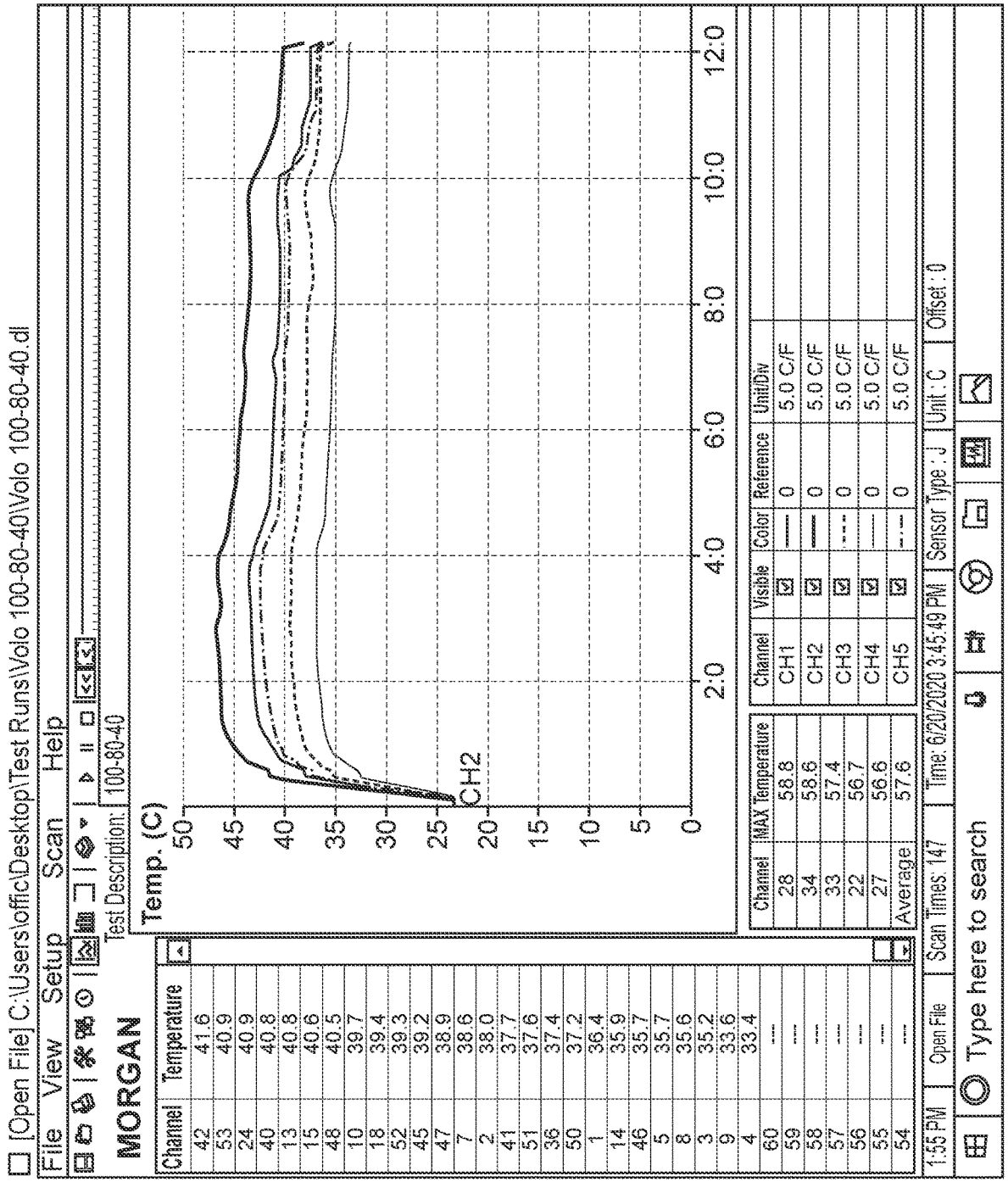
FIGS. 11A and 11B show the temperature test results for the battery operated hair dryer with modulation technique gradually dropping the power level over time the right and left infrared bulbs.
Figure 11B:
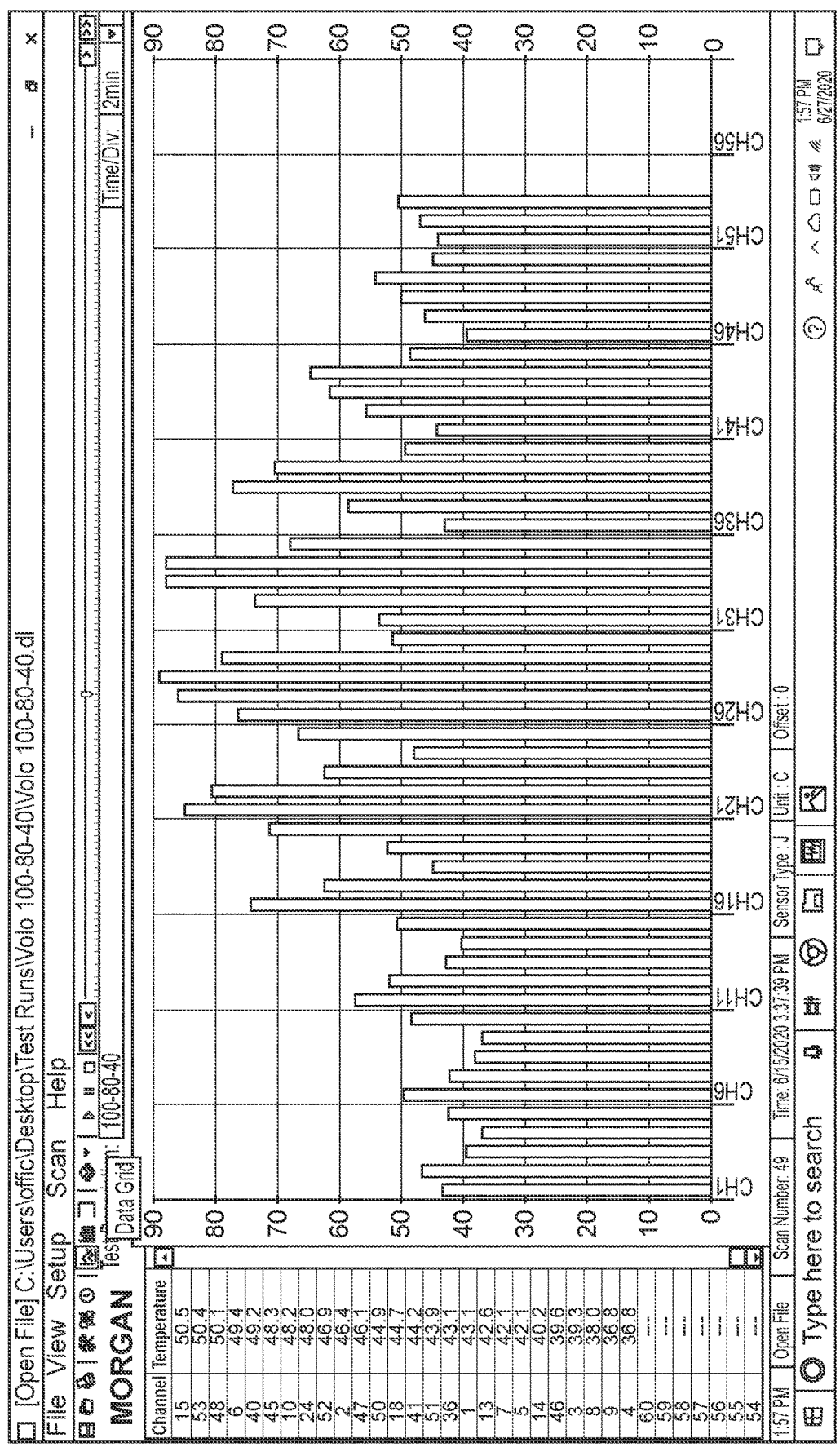

FIGS. 11A and 11B show the temperature test results for the battery operated hair dryer with modulation technique gradually dropping the power level over time the right and left infrared bulbs. The power level was:

0 m to 4 m: full power across all heating element components;

4 m to 8 m: IR left and IR right drop to 80%, nichrome stays at 100%; and 8 m on: IR left and IR right drop to 40%

During the test run, the average temperature @4 min was 188.6 deg. F and the runtime was 12 minutes 30 seconds. This configuration increased the run time by 1 m 10 s or 13.2%.

Adding Sensor Technology

In some embodiments, the invention also may contain a variety of sensors to detect the hair temperature during drying. By adding a sensor such as a contactless infrared thermometer, the hair dryer can measure the remote temperature of the hair and when the ideal hair temperature has been reached, the PWM may use one or more of the modulations techniques to adjust the power output to maintain the ideal hair temperature. Such a mechanism would be desirable from two standpoints: it would prevent the dryer from damaging the hair, 2) it would reduce power consumption and extend the battery run time.

In some embodiments the dryer can sense when it is aimed at the har and if it isn't pointed at hair the heating elements are turned off until it is back pointed at the hair. The fan may continue to run when the heating elements are turned off or may be turned off with them.

As discussed above, the heating element consisted of 2×200 W IR bulbs and 200 W of nichrome wire. In some embodiments there may be more the two infrared bulbs, such as three, four, etc. In some embodiments each infrared bulb may have a different wattage. In some embodiments the PWM may control the nichrome wire to reduce the power or pulse the power.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Embodiments presented are particular ways to realize the invention and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

The invention claimed is:

1. A battery-operated hair dryer, comprising:
a heating element positioned within an air flow channel; and
control circuitry coupled to the heating element and powered by at least one battery, the control circuit having an algorithm configured to determine the battery state-of-charge in real-time, calculate the remaining battery life before depletion, and determine a power mode setting to alter the power to the heating element to maximize the remaining battery life, and alter the power to the heating element for the power mode setting including multiple steps of power reduction;
wherein the multiple steps include 100% or full power to the heating element until the algorithm calculates that there is 4 minutes (of full-power) of battery life remaining, the power is then stepped down to 50% power until the algorithm calculates that there is about 45 seconds (of full-power) battery life remaining, and the power to the heating element is stopped and the hair dryer switches to cool shot to blow air until the battery is depleted.

2. A battery-operated hair dryer, comprising:
a heating element positioned within an air flow channel; and
control circuitry coupled to the heating element and powered by at least one battery, the control circuit having an algorithm configured to determine the battery state-of-charge in real-time, calculate the remaining battery life before depletion, and determine a power mode setting to alter the power to the heating element to maximize the remaining battery life, and alter the power to the heating element for the power mode setting;

wherein power mode setting provides 100% or full power to the heating element until the algorithm calculates that there is 45 seconds of battery life remaining and the power to the heating element is stopped and the dryer switches to cool shot to blow air until the battery is depleted.

3. A battery-operated hair dryer, comprising:

a heating element positioned within an air flow channel, wherein the heating element includes first and second infrared bulbs; and control circuitry coupled to the heating element and powered by at least one battery, the control circuit having an algorithm configured to determine the battery state-of-charge in real-time, calculate the remaining battery life before depletion, and determine a power mode setting to alter the power to the heating element to maximize the remaining battery life, and alter the power to the heating element for the power mode setting;

wherein the power mode setting includes reducing the power for the first and second infrared bulbs a constant amount.

4. The battery-operated hair dryer of claim 3, wherein reducing the power for the first and second infrared bulbs includes 100% power for 4 m, 80% from 4 to 8 m, 40% power from 8 m until the battery is depleted.

5. A battery-operated hair dryer, comprising:

a heating element positioned within an air flow channel, wherein the heating element includes first and second infrared bulbs; and control circuitry coupled to the heating element and powered by at least one battery, the control circuit having an algorithm configured to determine the battery state-of-charge in real-time, calculate the remaining battery life before depletion, and determine a power mode setting to alter the power to the heating element to maximize the remaining battery life, and alter the power to the heating element for the power mode setting;

wherein the wherein the power mode setting includes pulsing the power to the first and second infrared bulbs out of phase at different times.

6. The battery-operated hair dryer of claim 5, wherein pulsing the power to the first and second infrared bulbs includes powering the first infrared bulb at 100% and the second infrared bulb at 70% for 2 seconds, then switch to the first infrared bulb at 70% and second infrared bulb at 100% for 2 seconds, repeating switching the power between the first and second infrared bulbs every 2 seconds until the battery is depleted.

7. A battery-operated hair dryer, comprising:

first and second infrared bulbs positioned within an air flow channel; and control circuitry coupled to the first and second infrared bulbs and powered by at least one battery, the control circuit configured to modulate the power output of the first and second infrared bulbs to maximize the remaining battery life;

wherein modulate the power output of the first and second infrared bulbs includes reducing the power for the first and second infrared bulbs a constant amount.

8. The battery-operated hair dryer of claim 7, wherein reducing the power for the first and second infrared bulbs includes 100% power for 4 m, 80% from 4 m to 8 m, 40% power from 8 m until the battery is depleted.

9. A battery-operated hair dryer, comprising:

first and second infrared bulbs positioned within an air flow channel; and control circuitry coupled to the first and second infrared bulbs and powered by at least one battery, the control circuit configured to modulate the power output of the first and second infrared bulbs to maximize the remaining battery life;

wherein modulate the power output of the first and second infrared bulbs includes pulsing the power to the first and second infrared bulbs out of phase at different times.

10. The battery-operated hair dryer of claim 9, wherein pulsing the power to the first and second infrared bulbs includes powering the first infrared bulb at 100% and the second infrared bulb at 70% for 2 seconds, then switch to the first infrared bulb at 70% and second infrared bulb at 100% for 2 seconds, repeating switching the power between the first and second infrared bulbs every 2 seconds until the battery is depleted.

11. A battery-operated hair dryer, comprising:

first and second infrared bulbs positioned within and air flow channel; and control circuitry coupled to the first and second infrared bulbs and powered by at least one battery, the control circuit configured to pulse the power to the first and second infrared bulbs out of phase at different times to maximize the remaining battery life;

wherein pulsing the power to she first and second infrared bulbs includes powering the first infrared bulb at 100% and the second infrared bulb at 70% for 2 seconds, then switch to the first infrared bulb at 70% and second infrared bulb at 100% for 2 seconds, repeating switching the power between the first and second infrared bulbs every 2 seconds until the battery is depleted.

12. A battery-operated hair dryer, comprising:

first and second infrared bulbs positioned within and air flow channel; and control circuitry coupled to the first and second infrared bulbs and powered by at least one battery, the control circuit configured to pulse the power to the first and second infrared bulbs out of phase at different times to maximize the remaining battery life;

wherein control circuitry includes an algorithm configured to determine the battery state-of-charge in real-time, calculate the remaining battery life before depletion, and determine a pulsing power mode setting to alter the power to the first and second infrared bulbs to maximize the remaining battery life.

* * * * *